(12) United States Patent
Thompson et al.

(10) Patent No.: US 6,412,476 B1
(45) Date of Patent: Jul. 2, 2002

(54) FUEL SYSTEM

(75) Inventors: Robert H. Thompson, Redford; Michael Joseph Harrigan, Sr., Ann Arbor; Michael William Soltis, Livonia, all of MI (US)

(73) Assignee: Ford Global Tech., Inc., Dearborn, MI (US)

( * ) Notice: Subject to any disclaimer, the term of this patent is extended or adjusted under 35 U.S.C. 154(b) by 1 day.

(21) Appl. No.: 09/631,262

(22) Filed: Aug. 2, 2000

(51) Int. Cl.$^7$ ............................................. F02M 37/04
(52) U.S. Cl. ...................... 123/516; 220/530; 222/389; 138/31
(58) Field of Search ................. 123/510, 513, 123/516, 518, 520, 521, 447; 138/31; 222/389; 220/529, 530, 534, 535

(56) References Cited

U.S. PATENT DOCUMENTS

| | | | |
|---|---|---|---|
| 2,630,761 A | | 3/1953 | Mashinter |
| 3,043,340 A | * | 7/1962 | Rehbock ........................ 138/31 |
| 3,068,798 A | | 12/1962 | Machen |
| 3,528,344 A | | 9/1970 | Rabenhorst |
| 3,589,481 A | | 6/1971 | Motsch |
| 4,997,009 A | * | 3/1991 | Niikura et al. ................. 138/30 |
| 5,056,493 A | * | 10/1991 | Holzer ........................ 123/518 |
| 5,526,795 A | | 6/1996 | Thompson et al. |
| 5,528,897 A | * | 6/1996 | Halin ........................ 60/39.094 |
| 5,638,868 A | * | 6/1997 | Loran ........................... 138/31 |
| 5,722,374 A | * | 3/1998 | Kidokoro et al. ............. 123/516 |
| 5,809,771 A | * | 9/1998 | Wernberg ................. 60/39.094 |
| 5,845,879 A | | 12/1998 | Duane |
| 5,971,027 A | * | 10/1999 | Beachley et al. ............. 138/31 |
| 5,975,331 A | * | 11/1999 | Ishikawa ..................... 220/564 |
| 6,234,128 B1 | * | 5/2001 | Reuss ..................... 123/179.17 |
| 6,260,544 B1 | * | 7/2001 | Spry et al. .................. 123/516 |
| 6,267,147 B1 | * | 7/2001 | Rago ........................... 138/31 |
| 6,286,552 B1 | * | 9/2001 | Shimbori et al. ............. 138/31 |

* cited by examiner

Primary Examiner—Tony M. Argenbright
Assistant Examiner—Hai H. Huynh
(74) Attorney, Agent, or Firm—Ford Global Tech, Inc.

(57) ABSTRACT

A fuel system 10 which selectively receives, stores and delivers volatile fuel 16. Fuel system 10 includes a variable volume fuel tank 12 having a movable piston 22 which is attached to a pair of bellows diaphragm members 26, 28. Members 26, 28 selectively contract and expand to move piston 22 within tank 12, effective to alter the volume of the fuel containing portion 14 of tank 12, thereby maintaining fuel 16 in a pressurized state and substantially preventing the accumulation of vapors within tank 12.

14 Claims, 1 Drawing Sheet

FUEL SYSTEM

FIELD OF THE INVENTION

The present invention generally relates to a fuel system and more particularly, to a vehicular fuel system which includes a variable volume fuel tank and which receives, stores, and selectively delivers pressurized fuel to an internal combustion engine without using a conventional fuel pump.

BACKGROUND OF THE INVENTION

Vehicular fuel systems are adapted to selectively receive and store fuel for use within and/or by an engine (i.e., an internal combustion type engine), effective to allow a vehicle to be desirably driven and maneuvered.

Conventionally, these assemblies include a tank containing volatile or vaporific fuel, and an electric pump for delivering fuel from the tank to an internal combustion engine. Certain drawbacks, however, are associated with the use of these conventional fuel pumps. For example and without limitation, conventional fuel pumps often cause and/or allow undesirable fuel vapor bubbles to be formed within the fuel which reduce engine performance and efficiency.

Additionally, these prior types of fuel systems allow fuel which is stored within the tank to vaporize or evaporate. This fuel vapor collects above the fuel in the tank and may undesirably escape into the atmosphere. As a result of governmental regulation of emissions of this fuel vapor, automobile manufacturers have devised numerous methods and devices to selectively purge vapors from the tank, and to treat and controllably release such vapors into the ambient environment. These methods and devices undesirably add to the expense of the vehicle and may also allow some of the fuel vapors to undesirably escape into the atmosphere.

Attempts have been made to utilize a variable volume fuel tank for compressibly pressurizing the fuel within the tank in order to prevent fuel vaporization during the fuel delivery process. This type of variable volume fuel tank includes a piston which is movably disposed within the tank and which separates the tank into two volumes (e.g., one volume filled with fuel and one volume filled with pressurized air). The air is typically provided by a regulator which can be controlled by a microprocessor. The position of the piston is controlled in order to maintain the fuel at a relatively high pressure, thereby substantially reducing fuel vaporization. While this type of fuel delivery system solves many of the problems associated with conventional fuel systems, it does suffer from several drawbacks.

For example and without limitation, in order to prevent air from permeating the fuel, several relatively tight seals must be operatively disposed on the piston. These seals typically contact the housing of the tank and a guide rod on which the piston is disposed. These seals undesirably generate a relatively high amount of drag and may still allow an undesirable amount of air or vapor to permeate the fuel. Furthermore, these prior fuel systems utilize a spring and a pressure controlled clutch mechanism to allow the piston to retract during refueling. These clutch mechanisms undesirably increase the cost and complexity of the system. Moreover, these systems do not always provide sufficient delivery of fuel to the engine during system recharging and do not include a method or apparatus for extracting air that may be dissolved within and subsequently released from the fuel.

The present invention provides an improved pumpless fuel system which includes a variable volume fuel tank and which addresses the previously delineated drawbacks of prior fuel systems while concomitantly allowing fuel to be temporarily stored and communicated to an engine in an efficient and desired manner.

SUMMARY OF THE INVENTION

It is a first object of the present invention to provide a fuel system which overcomes at least some of the previously delineated drawbacks of prior fuel systems.

It is a second object of the present invention to provide a fuel system which includes a variable volume fuel tank for compressibly pressurizing the fuel within the fuel tank, thereby reducing the likelihood of undesirable fuel vapor emission.

It is a third object of the present invention to provide a fuel system which includes a variable volume fuel tank having a movable piston with reduced drag characteristics.

It is a fourth object of the present invention to provide a pumpless fuel system which includes an apparatus for extracting air that may be dissolved within and subsequently released from the fuel.

According to a first aspect of the present invention, a fuel system is provided. The fuel system includes a variable volume fuel tank including a first portion which selectively receives and contains an amount of fuel, and a second portion which selectively receives and contains an amount of pressurized gas; a piston which is movably disposed within the variable volume fuel tank; and at least one bellows member which is disposed within the tank, which at least partially defines the second portion of the tank, and which is coupled to a back surface of the tank, the at least one bellows member being selectively movable from a first contracted position to a second expanded position, the movement of the bellows member being effective to cause the piston to move within the variable volume fuel tank and to compressibly pressurize the amount of fuel.

According to a second aspect of the present invention, a method is provided for pressurizing an amount of fuel contained within a first portion of a fuel tank. The method includes the steps of providing a piston; movably disposing the piston within the fuel tank; providing at least one selectively expandable diaphragm; sealably connecting a first end of the at least one selectively expandable diaphragm to a back surface of the fuel tank, the at least one selectively expandable diaphragm being effective to define a second portion of the fuel tank which is sealably separated from the first portion of the fuel tank; and selectively introducing pressurized gas into the second portion of the fuel tank, effective to cause the at least one selectively expandable diaphragm to expand, thereby causing the piston to move within the variable volume fuel tank and to compressibly pressurize the amount of fuel.

These and other aspects, features, and embodiments of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
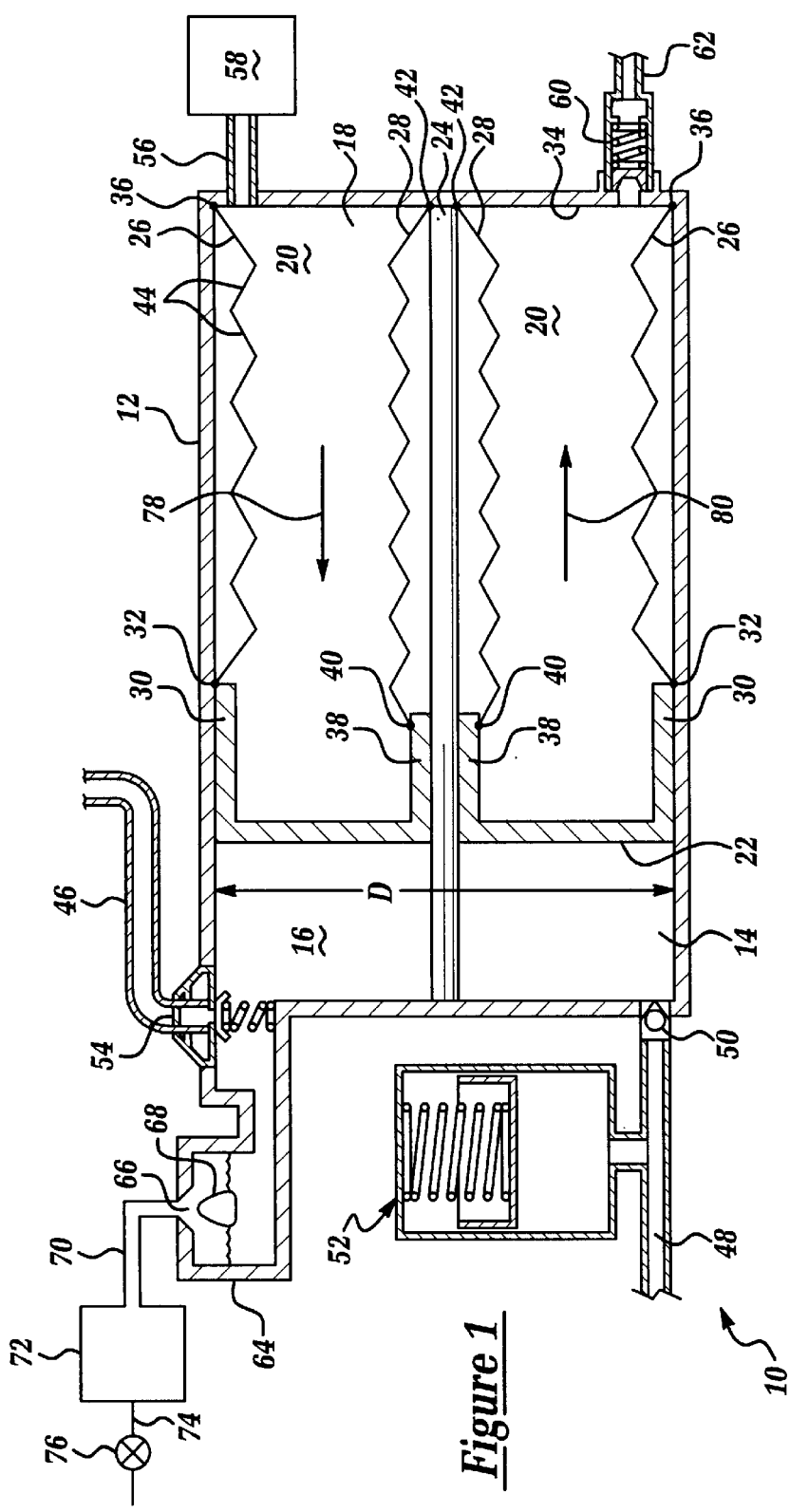
FIG. 1 is a schematic cross-sectional view of a fuel system which is made in accordance with the teachings of the preferred embodiment of the invention.

Referring now to FIG. 1, there is shown a fuel system 10 which is made in accordance with the teachings of the preferred embodiment of the invention, and which is adapted for use within an automotive vehicle. As shown, fuel system 10 includes a generally cylindrical container, housing, or tank 12 having a fuel-containing portion 14 which has a variable volume and which selectively receives and stores an amount of liquid fuel 16, and a second portion 18 which is sealed from the first portion and which selectively receives and contains an amount of pressurized air or gas 20. A piston 22 is movably disposed within tank 12 and more particularly, is slidably disposed upon a guide rod or member 24 which is conventionally and longitudinally mounted within tank 12. A pair of selectively expandable and collapsible "bellows" members or diaphragms 26, 28 are coupled to movable piston 22 and to tank 12. Particularly, outer bellows member 26 is sealably connected to the outer lip 30 of piston 22 by use of a conventional seal, clamp or ring 32, and is sealably connected to the periphery of the back surface 34 of tank 12 by use of a conventional seal, clamp or ring 36. Inner bellows member 28 is sealably connected to the inner lip 38 of piston 22 by use of a conventional seal, clamp or ring 40, and is sealably connected to the back surface 34 of tank 12 and/or around a rear portion of rod 24 (e.g., the portion of rod 24 contacting the back surface 34 of tank 12) by use of a conventional seal, clamp or ring 42. Bellows diaphragms 26, 28 and seals 32, 36, 40 and 42 cooperate to retain pressurized air or gas 20 within portion 18 and to prevent any air or gas 20 from escaping into fuel 16 (e.g., bellows members 26, 28 cooperatively define portion 18). Each bellows member 26, 28 includes several "bellows" or selectively expandable pleats 44 which are adapted to selectively expand or contract, thereby expanding and contracting the respective diaphragms 26, 28. In the preferred embodiment of the invention, diaphragms 26, 28 are made from a durable corrosion-resistant material such as a polymer or nylon material. In other non-limiting embodiments, diaphragms 26, 28 may be other types of selectively expandable diaphragms, and in one non-limiting embodiment, guide rod 24 is eliminated and a single diaphragm is used to move piston 22. In this alternate embodiment, the single diaphragm may have one "open" end which is sealably connected to the back surface 34 of tank 12 and one "closed" end which contacts the piston.

A conventional fuel filler pipe or conduit 46 is communicatively connected to portion 14 and allows fuel to be selectively delivered to fuel tank 12. Fuel filler pipe 46 includes a conventional nozzle receiving apparatus (not shown), which in one non-limiting embodiment is substantially identical in structure and function to the nozzle receiving end and apparatus described in U.S. Pat. No. 5,526,795 of Thompson et al. (the "'795 patent") which is assigned to the present assignee and which is fully and completely incorporated herein by reference. Fuel filler line 46 includes an anti-expulsion valve or device 54 (e.g., a one-way check valve) which prevents fuel from being forced through line 46 when tank 12 is pressurized.

A fuel supply line, tube or conduit 48 is also fluidly and communicatively coupled to portion 14 and selectively carries pressurized fuel to the engine (not shown). A one-way check valve 50 allows fuel or gas to flow from portion 14 to fuel supply line 48, while preventing fuel from flowing from line 48 back into portion 14. A conventional pressure accumulating mechanism 52, such as the one described within the '795 patent, is fluidly and communicatively coupled to fuel supply line 48 and is effective to maintain constant fuel pressure within line 48.

A pressure supply line or conduit 56 allows air or gas 20 to be controllably communicated to portion 18. Particularly, line 56 is coupled to a controllable source of pressurized air or gas 58 that may include a conventional compressor and regulator that are controlled by a conventional microprocessor-based control unit (e.g., an engine control unit). A one-way check valve 60 selectively and communicatively connects portion 18 to a pressure relief line 62 and allows air and gas 20 to be purged from portion 18.

In the preferred embodiment of the invention, tank 12 further includes a vapor extraction or separation chamber or portion 64, which may be integrally formed with and/or fluidly connected to portion 14. Chamber 64 includes a tapered aperture 66 that is formed within the top surface of chamber 64 and which allows gas or vapor within portion 14 to be selectively transferred through tube or conduit 70. Tube 70 is coupled to a vapor storage and/or collection chamber 72 which stores and/or collects the evaporated gas or vapor. A discharge tube 74 and controllably actuatable valve 76 (e.g., an electronically controlled valve) are coupled to chamber 72 and allow the collected vapor to be selectively delivered to a treatment container or discharged for combustion within the vehicle's engine.

Chamber 64 further includes a float member 68 which selectively engages aperture 66 when the level of fuel 16 is substantially "full", effective to close and/or seal aperture 66, thereby preventing liquid fuel from entering into conduit 70.

In operation, pressurized air or gas is selectively introduced into portion 18 through air input line or conduit 56, thereby causing pleats 44 to expand and forcing diaphragms 26, 28 to move from a compressed or constricted position to an expanded or extended position. As diaphragms 26, 28 expand from their compressed to their expanded positions, piston 22 moves in the direction of arrow 78, thereby pressurizing the fuel 16 within portion 14. Additionally, any air or vapor resident within portion 14 is forced through aperture 66 and into chamber or canister 72 for storage and/or combustion within the vehicle's engine. It should be appreciated that by maintaining fuel 16 in a pressurized state, system 10 substantially prevents or reduces the undesirable accumulation and/or production of fuel vapors within tank 12.

The use of bellows diaphragms 26, 28 provide significant "drag-reducing" benefits over prior variable volume fuel systems. Particularly, the use of bellows diaphragms 26, 28, allow piston 22 to move within fuel tank 12 without the requirement of tight "drag-producing" seals between the outer lip 30 of piston 22 and fuel tank 12 and/or between the inner lip 38 of piston 22 and the guide rod 24. The elimination of these seals allows piston 22 to relatively easily move within tank 12 (e.g., in the direction of arrows 78, 80) without a significant amount of drag, thereby desirably reducing the amount of air pressure required to move piston 22, while continuing to prevent air or gas from leaking into portion 14.

In the preferred embodiment of the invention, system 10 performs a controlled depressurization of portion 18 during refueling which allows piston 22 to move no further in the direction of arrow 80 than is required to depressurize the fuel and allow additional fuel to be added to tank 12. Particularly, regulator 58 and depressurization valve 60 cooperatively ensure (e.g., by the use of conventional electronic control) that the pressure within portion 18 of tank 12 is equal to the average pressure within portion 14 of tank 12.

Figure 2:
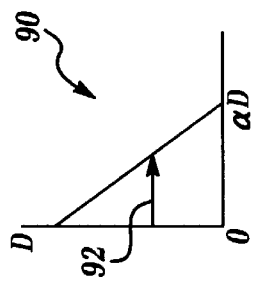
FIG. 2 is a graph representing the pressure exerted upon the piston of the fuel system shown in FIG. 1 as a result of the fuel residing within the system.

The pressure within portion 14 varies with the depth in the fuel tank 12. Referring now to FIG. 2, there is shown a graph 90 which illustrates the pressure within tank 12. Particularly, the vertical axis in FIG. 2 represents the height in fuel tank 12 above fuel line 48, while the horizontal axis represents pressure due to fuel within the tank. At height "D", the diameter of fuel tank 12, no column of fuel exists to exert pressure on piston 22. At fuel line 48, the pressure, "P", is approximately equal to the "height" of the column of fuel 20 above fuel line 48, "D", multiplied by the specific gravity of the fuel 20, "$\alpha$" (i.e., $P=\alpha D$). The average pressure exerted on piston 22 is represented by line 92, and in one non-limiting embodiment is equal to the distance that rod 24 is above fuel line 48.

System 10 utilizes this average pressure to controllably depressurize portion 14. Particularly, regulator 58 and valve 60 cooperatively ensure in a conventional manner that the pressure within portion 18 is substantially equal to this average pressure value. In this manner, the forces exerted on piston 22 will be substantially equal on both sides of piston 22 and the piston 22 will move freely during refueling (e.g., in the direction of arrow 80) and no further than the distance required to depressurize the fuel. Hence, the present system 10 allows for controlled depressurization and piston movement within tank 12 without requiring a complex and expensive clutch mechanism.

System 10 further provides additional improvements over prior variable volume tank systems. For example and without limitation, the air extraction portion or system of fuel system 10 (e.g., air separation chamber 64, air collection chamber 72 and purge valve 76) selectively allows vapor and air, which may be released from fuel 20, to be extracted from portion 14 and "purged" or combusted within the vehicle's engine.

In alternate embodiments where fuel tank 12 is relatively large, fuel system 10 further includes an auxiliary electrical fuel delivery module or pump assembly, which may comprise a conventional type electric fuel pump. In such alternate embodiments, the fuel delivery module or pump assembly is conventionally and operatively disposed within the tank 12 and is physically and operatively coupled to the fuel supply line 48, effective to selectively cause the contained fuel 20 to forcibly enter the line or conduit 48 and travel to the vehicle engine (not shown). The auxiliary electric pump may be selectively activated during the recharging or repressurization of the gas or air supply 58 and/or during transient fuel demand conditions. In one non-limiting embodiment, the auxiliary fuel pump may replace pressure accumulator 52. In another non-limiting embodiment, system 10 uses the auxiliary fuel pump and the air extraction system to operate in an alternate mode in which the fuel chamber or portion 14 is predominantly under a vacuum pressure and the air chamber or portion 18 is at atmospheric pressure.

It should be understood that the invention is not limited to the exact embodiment or construction which has been illustrated and discussed above, but that various changes and modifications may be made without departing from the spirit and the scope of the invention as is set forth in the following claims.

What is claimed is:

1. A fuel system comprising:
    a variable volume fuel tank including a first portion which selectively receives and contains an amount of fuel, and a second portion which selectively receives and contains an amount of pressurized gas;
    a piston which is movably disposed within said variable volume fuel tank;
    a guide member which is longitudinally disposed within said fuel tank and upon which said piston is slidably mounted; and
    a pair of bellows members which are disposed within said tank, which defines said second portion of said tank and which are coupled to a back surface of said tank, said pair of bellows members comprising a first inner bellows member and a second outer bellows member which are selectively movable from a first contracted position to a second expanded position, said movement of said pair of bellows members being effective to cause said piston to move within said variable volume fuel tank and to compressibly pressurize said amount of fuel.

2. The fuel system of claim 1 wherein said second portion is communicatively connected to a controllable supply of pressurized gas which is selectively communicated to said second portion, effective to cause said at least one bellows member to move from said first contracted position to said second expanded position.

3. The fuel system of claim 2 wherein said amount of fuel within said first portion has a certain average pressure and wherein said controllable supply of pressurized gas is effective to cause said amount of gas within said second portion to remain at approximately said certain average pressure during refueling.

4. The fuel system of claim 1 wherein said piston includes an outer lip member and an inner lip member and wherein said first inner bellows member is sealably connected to said inner lip member and said outer bellows member is sealably connected to said outer lip member.

5. The fuel system of claim 4 wherein said fuel tank is disposed within an automotive vehicle.

6. The fuel system of claim 1 further comprising a separation chamber which is fluidly connected to said first portion, said separation chamber including an aperture which selectively allows an amount of vapor to be discharged from said separation chamber and a float member which selectively seals said aperture when said separation chamber is substantially filled with fuel.

7. The fuel system of claim 6 wherein said air separation chamber is coupled to a vapor collection chamber which selectively stores said discharged amount of vapor.

8. A variable volume fuel tank comprising:
    a generally cylindrical housing including a first portion which selectively receives and contains an amount of fuel, and a second portion which selectively receives and contains an amount of pressurized gas;
    a guide rod which is longitudinally mounted within said housing;
    a piston which is slidably disposed on said guide rod and which includes an inner lip and an outer lip;
    a first bellows member having a first end which is sealably connected to said outer lip of said piston and a second end which is sealably connected to a back portion of said housing; and
    a second bellows member which is concentric to said first bellows member and having a third end which is sealably connected to said inner lip of said piston and a fourth end which is sealably connected to said back portion of said housing;
    wherein said piston and said first and second bellows members cooperatively define said second portion of said housing, and wherein said first and second bellows members are selectively expandable, effective to cause said piston to move within said housing and to compressibly pressurize said amount of fuel.

9. The variable volume fuel tank of claim 8 further comprising:

a source of pressurized gas which is communicatively coupled to said back portion of said housing and which is effective to communicate pressurized gas into said second portion of said housing.

10. The variable volume fuel tank of claim 9 wherein said amount of fuel within said first portion has a certain average pressure and wherein said source of pressurized gas is effective to cause said amount of gas within said second portion to remain at approximately said certain average pressure during refueling.

11. The variable volume fuel tank of claim 10 further comprising a separation chamber which is fluidly connected to said first portion, said separation chamber including an aperture which selectively allows an amount of vapor to be discharged from said separation chamber and a float member which selectively seals said aperture when said separation chamber is substantially filled with fuel.

12. A method for pressurizing an amount of fuel contained within a first portion of a fuel tank, said method comprising the steps of:

providing a piston;

movably disposing said piston within said fuel tank;

providing at least one selectively expandable diaphragm;

sealably connecting a first end of said at least one selectively expandable diaphragm to a back surface of said fuel tank, said at least one selectively expandable diaphragm being effective to define a second portion of said fuel tank which is sealably separated from said first portion of said fuel tank; and selectively introducing pressurized gas into said second portion of said fuel tank, effective to cause said at least one selectively expandable diaphragm to expand, thereby causing said piston to move within said variable volume fuel tank and to compressibly pressurize said amount of fuel;

wherein said at least one selectively expandable diaphragm comprises a first bellows member having a second end which is sealably connected to said piston and a second bellows member concentric to said first bellows member and having a third end which is sealably connected to said piston.

13. The method of claim 12 further comprising the steps of:

providing a guide rod;

mounting said piston on said guide rod; and longitudinally mounting said guide rod within said fuel tank.

14. The method of claim 12 wherein said amount of fuel within said first portion has a certain average pressure, said method further comprising the steps of:

causing said amount of gas within said second portion to remain at approximately said certain average pressure during refueling.

* * * * *